H. A. JOHNSTON.
TRANSMISSION APPARATUS FOR GAS ENGINES.
APPLICATION FILED OCT. 22, 1912.
1,099,377.
Patented June 9, 1914.
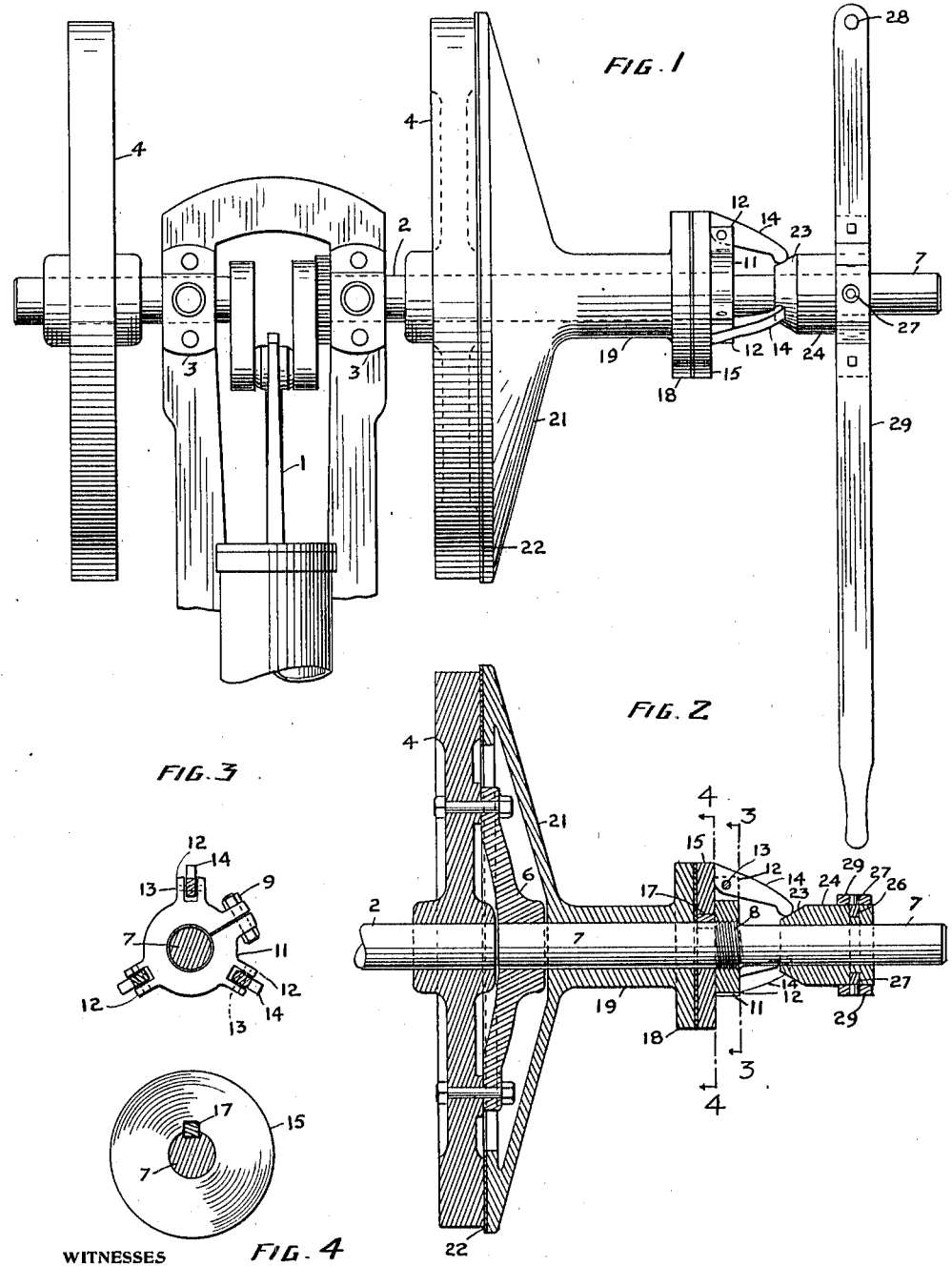
WITNESSES
INVENTOR
Harry A. Johnston,
BY Francis M. Wright,
his ATTORNEY

UNITED STATES PATENT OFFICE.

HARRY A. JOHNSTON, OF FRESNO, CALIFORNIA.

TRANSMISSION APPARATUS FOR GAS-ENGINES.

1,099,377. Specification of Letters Patent. Patented June 9, 1914.

Application filed October 22, 1912. Serial No. 727,126.

*To all whom it may concern:*

Be it known that I, HARRY A. JOHNSTON, a citizen of the United States, residing at Fresno, in the county of Fresno and State of California, have invented new and useful Improvements in Transmission Apparatus for Gas-Engines, of which the following is a specification.

This invention relates to a transmission apparatus for transmitting power from motors, and especially from internal combustion engines, and the object of the invention is to provide such an apparatus, the application of which will be easy and gradual and without jar or shock, which, when not in use, will cause the least possible amount of drag or friction upon the prime motor, and with which a pulley of any desired diameter may be used for transmitting power.

In the accompanying drawing, Figure 1 is a plan view, partly in section of my improved transmission apparatus, shown as applied to an internal combustion engine; Fig. 2 is a sectional view of the apparatus; Figs. 3 and 4 are cross sectional views on the line 3—3 and 4—4 of Fig. 2 respectively.

Referring to the drawing, 1 indicates the connecting rod and 2 the crank shaft of an internal combustion engine, said crank shaft rotating in bearings 3 and carrying fly wheels 4. To one of said fly wheels is bolted co-axially therewith a disk 6 secured to a central shaft 7 in line with the crank shaft. By this construction the transmission mechanism can be applied to any gas engine already built, although, instead thereof, the crank shaft may be extended and used instead of the shaft 7, the disk 6 being omitted. A portion 8 of said shaft 7 is threaded, and on said threaded portion 8 is clamped, by a bolt 9, a split collar 11, having radially extending forks 12. In said forks are pivoted, as shown at 13, levers 14, short arms of which abut against a disk 15 keyed on the shaft 7, as shown at 17, but slidable thereon. Said disk 15 abuts against a disk 18 formed on one end of a tubular shaft or sleeve 19 loosely surrounding the shaft 7, the other end of said sleeve 19 being formed with a large concave or dish-shaped disk 21, which is formed near its periphery with an annular plane friction surface, having secured thereon suitable brake lining 22. The size of this disk 21 is such that the annular friction surface lies in close contact with the outer flat portion of the fly wheel near its periphery. Long arms of said levers are engaged by a conical portion 23 of a spreader 24, which is formed with a circumferential groove 26, in which can move semi-circular arms 27, pivoted as shown at 28, to a slotted lever 29. It will be seen that by moving this lever to the left in Fig. 1, the spreader will be operated to spread the long arms of the lever, thereby causing their short arms to press the disk 15 inwardly against the disk 18, and thereby causing the annular friction surface of the disk 21 to press firmly against the flat portion of the fly wheel.

The collar 11 is internally threaded, and, as the friction surface of the disk 21 wears, the collar may be unclamped from the threaded portion 8 of the shaft by unscrewing the nut on the bolt, and may then be screwed inward on said threaded portion, and reclamped in the adjusted position.

On account of the large extent of friction surface between the fly wheel and the large disk 21, a comparatively small degree of pressure is required to effect transmission from said fly wheel to said disk. A very advantageous feature of the apparatus is that the sleeve 19 permits of a pulley of any desired diameter to be secured thereon. Furthermore when the transmission apparatus is not in use there is very little loss of energy due to friction, substantially the only friction being that of the sleeve 29 upon the shaft. All these advantages are obtained without it being necessary to change the construction of the fly-wheel or motor shaft, except to bore the bolt holes therethrough.

I claim:—

In combination with the fly wheel of a prime-motor, a disk having a central bearing, bolts near the periphery of the disk securing it to the fly-wheel at intermediate points thereof, a shaft rotating in said bearing, a sleeve loosely surrounding said shaft and having integral therewith a concave disk, receiving therewithin the first-named disk and means for pressing the marginal portion of the concave disk against the flywheel.

In testimony whereof I have hereunto set my hand in the presence of two subscribing witnesses.

HARRY A. JOHNSTON.

Witnesses:
   FRANCIS M. WRIGHT,
   D. B. RICHARDS.

---

Copies of this patent may be obtained for five cents each, by addressing the "Commissioner of Patents, Washington, D. C."